United States Patent Office 2,798,057
Patented July 2, 1957

2,798,057

WRINKLE DRYING COATING COMPOSITIONS CONTAINING ETHYL SILICATE

George J. Collins, Fairborn, Ohio, assignor to Midland Chemical Corporation, Dayton, Ohio, a corporation of Delaware No Drawing. Application February 16, 1954,
Serial No. 410,717

3 Claims. (Cl. 260—19)

This invention relates to coating compositions and more particularly to drying oil coating compositions containing organic silicon compounds as drying accelerators. The compositions of the invention are adapted to dry to a smooth or wrinkle finish, depending upon the constituents and drying conditions.

In prior art coating compositions of this character it has been common practice to incorporate metal compounds as drying accelerators. For example, the resinates, acetates, napthenates, and linoleates of the metals such as lead, cobalt, manganese, etc. have been conventionally employed as driers. These metallic driers, however, tend to cause discoloration of the product in use and hasten the darkening of compositions containing white or light-colored pigments as used in the preparation of enamels and paints. Further, the introduction of metals, e. g., lead, cobalt and the like is often undesirable because of their poisonous or injurious nature.

In accordance with the present invention, a coating composition of the drying oil type is produced wherein an organic compound of silicate is used as a drier, either alone or in combination with metallic drier compounds.

The preferred organic silicate compounds found useful for this purpose are derivatives of silicon tetrachloride SiCl₄. A particularly useful organic silicate compound is ethyl ortho-silicate Si(OC₂H₅)₄, sometimes referred to as tetra-ethoxysilicane or more recently tetra-ethoxsilane. Ethyl disilicate may also be used.

Other compounds of silicon having the general formula R$_n$SiY$_{4-n}$ may be used wherein $n$ is an integer from 1 to 3, R is a monovalent hydrocarbon radical, and Y is a group selected from the class consisting of H, halogen, alkoxy, aroxy, and amino. Further, silico-orthoesters, such as (C₅H₁₁O)$_n$Si(OC₂H₅)$_n$ may be utilized wherein $n$ is an integer from 1 to 4 and which compounds may be made by reacting the chlorosilicate ester with alcohol.

Utilizing the organic silicon compounds as driers in drying oil compositions, as described, a plain or wrinkle drying film may be produced. The compositions are adapted to be air dried or baked, to produce a coating which does not tend to discolor or yellow as do like compositions in which metal driers are incorporated.

To illustrate the manner of utilizing this invention and its advantages, the following examples are given as typical compositions but it is understood that this application is not to be limited thereto inasmuch as obvious variations and substitutions can be made without departing from the spirit and scope of the invention. All parts are by weight unless otherwise stated.

EXAMPLE 1

| | Parts |
|---|---|
| Rosin modified phenolaldehyde resin (Amberol F7 or Beckacite) _____lbs__ | 100 |
| Raw tung oil _____gals__ | 18 |
| Heat-bodied linseed oil (Z4 viscosity) _____gals__ | 2 |
| Xylol _____gals__ | 10 |
| Toluol _____gals__ | 24 |

Beckacite resin is an oil-soluble phenol formaldehyde type resin the formula and method of preparing being described in U. S. Patents Nos. 1,623,901 and 1,632,113.

The above oleo-resinous varnish is prepared by introducing the tung oil and one-half of the resin in a kettle and heating the mixture to a top heat of about 550° F. The batch is then allowed to cool to 525° F., at which point it is held until a slight stringing is observed in the drip from a hot stirring paddle. The kettle is then removed from the fire and polymerization is checked by the addition of the linseed oil and the remaining portion of the resin, the ingredients being stirred into the heated mass. Preferably the last of the resin is added in small pieces so as to dissolve rapidly in the hot mixture. After incorporating the oil and resin the temperature of the batch is allowed to fall to about 350° F. and the xylol and toluol thinners are then added.

In the preparation of coating compositions using ethyl silicate as a drier, the following compositions were made and tested using the drying oil resinous varnish of Example 1 as a vehicle.

EXAMPLE 2

In this example, to the oleo-resinous vehicle of Example 1 there was incorporated 0.1% by weight ethyl silicate, the latter being a colorless liquid, B. P. 165–166° C. and soluble in organic solvents.

EXAMPLE 3

In this example the composition consisted of the oleo-resinous vehicle of Example 1 in which 1% by weight of ethyl silicate is incorporated.

EXAMPLE 4

In this example the composition consisted of the oleo-resinous vehicle of Example 1 containing 10% by weight of ethyl silicate.

EXAMPLE 5

In this example the composition consisted of the oleo-resinous vehicle of Example 1 containing 1% by weight of cobalt naphthenate, the naphthenate being dissolved in a portion of the toluol or naphtha thinner.

The following table shows the results obtained spraying each of the coating compositions of Examples 2 to 5 on a metal panel and baking the same as shown. The time for wrinkling and film characteristics are shown.

Table I.—15 minute bake—infra-red 350° F.

| Product | Drier | Time to Wrinkle | Film Characteristics |
|---|---|---|---|
| Exp. 2 | Ethyl silicate 0.1% | 6 min. | Clear, large pattern, strong wrinkle. |
| Exp. 3 | Ethyl silicate 1.0% | 6½ min. | Do. |
| Exp. 4 | Ethyl silicate 10.0% | No wrinkle. | Opaque, waxy, no wrinkle. |
| Exp. 5 | Cobalt Naphthenate 1.0% | 1½ min. | Clear, medium to small pattern, strong wrinkle. |

Referring to Table I, it will be noted that the coating compositions containing 0.1% ethyl silicate when baked for 15 minutes under infra-red light dried to a wrinkle finish in 6 minutes, whereas with increased ethyl silicate content above 1% the wrinkle time was increased, and with a silicate content of 10% (Exp. 4) the wrinkle drying of the coating composition was inhibited.

In the case of Example 5 containing cobalt naphthenate, the time required to initiate wrinkle was substantially reduced over the ethyl silicate, indicating that this metallic drier is a more powerful surface drier than ethyl silicate.

When the above coating films were compared for hardness after approximately 20 hours following the baking treatment, the coating film of Example 3, and containing 1% ethyl silicate drier was harder when tested with the fingernail than cobalt naphthenate drier of Example 5, thus indicating that ethyl silicate, although not drying as fast on the surface, functions as an over-all drier and hardener throughout the body of the film.

When the coating compositions of Examples 2 and 5 were tested on an overnight air dry, it was observed that the formulations containing from 0.1% to 1% ethyl silicate dried to a clear, smooth film, whereas the compositions of Example 5 containing cobalt naphthenate showed wrinkling of the film on overnight air drying. The resultant air dried films of the examples set forth in Table I, were tested after 20 hours and it was noted that the coating films containing ethyl silicate from 0.1% to 1.0% as a drier were slightly harder under the fingernail than coating films of Example 5 composition and which contained cobalt naphthenate.

The following examples illustrate the results obtained utilizing a combination of metallic driers and ethyl silicate in pigmented varnish vehicles. Test results made using these modified silicon drier compositions containing both alkyl silicate and metal driers is shown in Table II.

Typical examples of pigmented white pastes are as follows:

WHITE PASTE A

Titanium oxide _____ pounds__ 8–10
Varnish (Example 1) _____ gallons__ 1

WHITE PASTE B

Titanium oxide _____ pounds__ 7–9
Zinc oxide _____ do____ 1–3
Varnish (Example 1) _____ gallons 1

Other pigments, such as asbestine, may be substituted for a part of the pigments used in making the paste if desired. The mixture of pigment and varnish is passed through a paint mill one or more times to thoroughly disperse the pigment in the vehicle.

*Example 7*

In this example, to the oleo-resinous vehicle of Example 1 there was incorporated 0.04% cobalt naphthenate and 0.02% manganese naphthenate, based on the total weight of the composition. An enamel is made by adding three pounds of white paste A to each gallon of vehicle.

*Example 8*

In this example, the oleo-resinous vehicle of Example 1 comprises a drier consisting of a mixture of cobalt naphthenate 0.04% and lead acetate 0.08%. Two and one-half pounds of paste B is added per gallon of vehicle to provide an enamel.

*Example 9*

In this example, to the oleo-resinous vehicle of Example 1 there was incorporated a drier consisting of a mixture of cobalt naphthenate 0.04% and ethyl silicate 0.03%. Three pounds of paste A is added per gallon of this vehicle to produce a pigmented product.

*Example 10*

In this example, to the oleo-resinous vehicle of Example 1 there was incorporated a drier consisting of ethyl silicate 0.1% alone for comparison. To produce an enamel three pounds of paste A is added per gallon of the vehicle.

In Table II below the results of applying and drying films of the coating compositions of the pigmented formulations of Examples 7, 8, 9, and 10 and subjecting them to 10 minutes of infra-red heat drying as well as after air drying over night is shown. In the formulations given, the metal driers, e. g., cobalt, lead and manganese are introduced as naphthenates.

Table II

| Product | Drier | Coloring Effect with 10-min. Infra-Red | Coloring Effect with Overnight Air Dry |
| --- | --- | --- | --- |
| Exp. 7 | Cobalt 0.04%, Manganese 0.02%. | Yellowed badly | Slightly yellow. |
| Exp. 8 | Cobalt 0.04%, Lead 0.08%. | do | Do. |
| Exp. 9 | Cobalt 0.04%, Ethyl silicate 0.03%. | Off White | White. |
| Exp. 10 | Ethyl Silicate 0.1% | White | Do. |

The coating films of Examples 9 and 10, as indicated in Table II, showed less yellowing effect than Examples 7 and 8. When the enamels were compared after an overnight air dry, Example 9 containing ethyl silicate combined with cobalt as a drier, showed no discoloration whereas the compositions of Examples 7 and 8 using a combination of metal driers were discolored.

Additional tests made using the same oleo-resinous varnish, and wherein the amount of metal drier was increased to 0.06% in the case of manganese and cobalt and 0.24% in the case of lead when tested under the infra-red heat lamp and overnight air dry, showed distinct yellowing and discoloration, thus indicating that the metallic driers cause definite color deterioration.

The following Table III, shows the results of similar oleo-resinous compositions made using the vehicle of Example 1 plus various amounts of drier, as shown.

*Table III.—10 minute bake—infra-red lamps (350° F.)*

| Drier | Time to Wrinkle | Film Characteristics |
| --- | --- | --- |
| Cobalt and Naphthenate 0.06% | 1 min | Small pattern, strong wrinkle. |
| Lead-Acetate 0.24% | No wrinkle | Clear, smooth, slightly rolling film. |
| Manganese Naphthenate 0.06% | 1 min | Small pattern, strong wrinkle. |
| Ethyl Silicate 0.1% | 6 min | Larger pattern, medium wrinkle. |

As shown in Table III above, the oleo-resinous composition containing ethyl silicate wrinkled on being baked for 6 minutes under infra-red lamps. Although the wrinkling time is longer than in the case of cobalt drier the ethyl silicate is definitely superior to lead drier where wrinkling is desired.

In further tests of the above compositions of Table III the results indicated that on an overnight air dry, the compositions containing ethyl silicate alone (0.1%) no wrinkling occurred and the film dried to a clear, smooth finish. However, in the case of cobalt naphthenate, using 0.06% as in Table III a wrinkle drying film was produced after one hour and ten minutes. This improved wrinkle drying time was expected inasmuch as cobalt is a very active surface drier.

In further tests employing a combination of cobalt naphthenate and ethyl silicate as a drier, and comparing these compositions with like oleo-resinous varnishes containing manganese and lead naphthenate, both alone and in combination with cobalt naphthenate is shown in Table IV. The varnish in each case was made up as in the formulation of Example 1, and the metals were incorporated in each case as naphthenates.

The following table shows the results obtained by an overnight air dry using similar combinations of driers as in Example IV.

*Table V.—overnight air dry*

| Drier in Varnish of Exp. 1 | Time to Wrinkle, hours | Film characteristics |
|---|---|---|
| Manganese 0.06% | 1 | Strong wrinkle, medium pattern. |
| Cobalt 0.04%, Manganese 0.02% | 1 | Do. |
| Cobalt 0.06% | 1 | Do. |
| Cobalt 0.05%, Ethyl silicate 0.03% | 2½ | Strong wrinkle, large pattern. |
| Cobalt 0.04%, Lead 0.08% | 3 | Weak wrinkle, fringe pattern only. |
| Ethyl silicate 0.1% | None | Smooth, clear surface. |
| Lead 0.24% | None | Do. |

The table shows that the use of ethyl silicate as a drier alone, or in combination, is effective to produce a coating film having good drying characteristics.

It will be understood that while there has been described hereinabove certain embodiments of the present invention and the test results of particular compositions set forth, the invention is not to be restricted thereto. The present invention is susceptible to various modifications of the compositions and method of application and drying to a film, depending upon the conditions and uses to which the coating compositions are to be put, the disclosure and scope of the invention being more particularly set out in the appended claims.

What is claimed is:

1. A wrinkle drying coating composition comprising rosin modified phenol aldehyde resin, tung oil, ethyl silicate and solvent thinner, said ethyl silicate being present in the amount of from 0.1 to 1.0% by weight of the composition.

2. A wrinkle drying coating composition as in claim 1, in which a metal drier is incorporated.

3. A wrinkle drying coating composition comprising rosin modified phenol aldehyde resin, tung oil, pigment, ethyl silicate and solvent thinner, said ethyl silicate being present in the amount of from 0.1 to 1.0% by weight of the composition.

References Cited in the file of this patent

UNITED STATES PATENTS

| 1,809,755 | King et al. | June 9, 1931 |
| 2,048,799 | Lawson | July 28, 1936 |
| 2,260,880 | Bartlett | Oct. 28, 1941 |
| 2,395,550 | Iler et al. | Feb. 26, 1946 |